United States Patent [19]

Brandstadter

[11] 3,752,499

[45] Aug. 14, 1973

[54] FLUID-MECHANICAL SUSPENSION SYSTEM

[76] Inventor: Jack M. Brandstadter, 1904 Cresthill, Royal Oak, Mich. 48073

[22] Filed: Apr. 26, 1971

[21] Appl. No.: 137,508

[52] U.S. Cl. .......... 280/124 F, 180/9.2 R, 267/15 A
[51] Int. Cl. ............................................. B60g 17/08
[58] Field of Search ....................... 267/15 A, 15 R; 280/124 R; 180/9.2 R

[56] References Cited
UNITED STATES PATENTS

| | | | |
|---|---|---|---|
| 3,329,226 | 7/1967 | Gustafsson ....................... | 180/9.2 R |
| 3,254,738 | 6/1966 | Larsen .............................. | 180/9.2 R |

*Primary Examiner*—Philip Goodman
*Attorney*—Hauke, Gifford & Patalidis

[57] ABSTRACT

A fluid-mechanical suspension system for a multi-wheeled vehicle providing for each individual wheel to be capable of upward deflection over an obstacle without imparting a similar motion to the vehicle as a whole. Each wheel of the vehicle is carried by a support arm pivotally mounted on the vehicle by way of a spindle journalled in an appropriate bearing to permit a defined amount of vertical displacement of the wheel with respect to the vehicle. A fluid cylinder having a reciprocable piston is actuated by a connecting rod pivotably connected to a crank arm projecting radially from the support arm spindle, such that the volume of the fluid in the cylinder is decreased by an upward vertical displacement of the wheel with respect to the vehicle and increased by a downward vertical displacement of the wheel. Each fluid cylinder is connected to a common source of system pressure, such as a control accumulator, such that each fluid cylinder and its associated mechanical transmission provides a positive rate of change in the vertical force with a corresponding change in wheel displacement. The support arm and the crank arm are angularly mounted on the spindle relatively to each other and to the horizontal, and their effective lengths are such that they form a non-linear variable ratio mechanical transmission or coupling means between the road wheel and the fluid cylinder.

A second embodiment of the present invention is disclosed as employing a rotary displacement mechanism in place of the fluid cylinder.

In one example of the present invention the fluid-mechanical suspension system is in the form of a plurality of wheels mounted on both sides of a vehicle with the fluid cylinders associated with each wheel being interconnected with one another and a central common accumulator such that the pressure of the fluid in any one of the cylinders is a function of the volume of fluid in the accumulator. The fluid cylinders associated with the corner wheels of the vehicle are preferably provided with a valving mechanism that is operable upon a predetermined pressure differential between the accumulator and its associated fluid cylinder to limit the rate of fluid communication between the fluid cylinder and the common accumulator providing for a dampening of vertical movements of the corner wheels with respect to the vehicle. Means are provided for selectively controlling the height of the vehicle.

19 Claims, 16 Drawing Figures

PATENTED AUG 14 1973

INVENTOR
JACK M. BRANDSTADTER

BY
Hauke Gifford & Patalidis
Attorneys

INVENTOR
JACK M. BRANDSTADTER

PATENTED AUG 14 1973 3,752,499

INVENTOR
JACK M. BRANDSTADTER

BY

Hauke Gifford & Patalidis
Attorneys

INVENTOR
JACK M. BRANDSTADTER

FLUID-MECHANICAL SUSPENSION SYSTEM

BACKGROUND OF THE INVENTION

1. Field of the Invention

The present invention relates to a fluid-mechanical suspension system for absorbing shocks experienced by the wheels of a moving vehicle and, in particular, the invention relates to a fluid-mechanical suspension system in which the vertical motion of each wheel of the vehicle is coupled by a non-linear variable ratio mechanical transmission to a fluid cylinder, all of which are connected to a common source of pressure to provide a positive rate of change in the vertical force imparted to each of the wheels as the vertical displacement of the wheels varies.

2. Description of the Prior Art

Heretofore, a variety of suspension systems have been employed for mounting wheels to a vehicle such that each individual wheel may deflect upwardly over an obstacle without imparting a similar motion to the vehicle as a whole. Such prior suspension systems have included mechanical or pneumatic springs in conjunction with a suitable connection between the wheel and the vehicle. Such suspension systems are inherently bulky, require shock absorbers and complicated pneumatic or hydraulic control circuits, in addition to other components required to regulate or limit the action of the suspension.

The prior art suspension systems have been primarily designed from the standpoint of providing a smooth ride, greater vehicle stability, adjustment to varying loads, and other functional factors. In order to have high performance characteristics, including a well dampened system having a high load capacity, such prior art systems are complex, heavy and expensive to design and manufacture. Many vehicles, and in particular military combat vehicles such as tanks, armored personnel carriers and the like, have a series of individually mounted road wheels which carry endless tracks that require a resilient suspension that must operate on a very difficult terrain. Most track-type military vehicles have heretofore employed a torsion bar type of suspension or a hydro-pneumatic type of suspension independently operable to absorb the shocks transmitted by the wheels to the vehicle. These systems, as well as other conventional suspension systems, are either complex and expensive, or have limited performance characteristics.

SUMMARY OF THE INVENTION

The present invention provides a fluid-mechanical system in which each wheel of a vehicle is carried on the end of a pivotal support arm which is coupled to a fluid displacement mechanism by a non-linear variable ratio mechanical transmission or coupling means for controlling the vertical movement of each wheel to permit the wheel to deflect upwardly over obstacles without imparting a similar motion to the vehicle as a whole. The fluid mechanism associated with each wheel is interconnected with other similar mechanisms of the fluid-mechanical suspension system and to a common source of system pressure such that the suspension system provides a positive rate of change of the vertical force imparted to the wheels which corresponds to the change in the vertical displacement of each of the wheels.

The fluid-mechanical suspension system of the present invention eliminates the need of mechanical or pneumatic springs at each wheel and thus provides a fluid-mechanical suspension system having a minimum of components which results in a system of low cost, low weight and high reliability.

It is therefore an object of the present invention to provide a fluid-mechanical suspension system which furnishes a positive rate of change of the vertical force imparted to the wheels which corresponds to the change in the vertical displacement of each of the vehicle wheels and which has a low spring rate and large capacity when supporting the static weight of the vehicle.

It is also an object of the present invention to provide a fluid-mechanical suspension system having performance characteristics comparable to or greater than the performance characteristics of the more complex, heavier, and more expensive suspension sytems previously used.

It is another object of the present invention to provide a fluid-mechanical suspension system in which the inter-flow between individual fluid mechanisms controlling the movement of each wheel and which are interconnected with a common source of system pressure is used to advantage to provide an efficient means for dampening the vehicle, as well as an efficient means for distribution and dissipation of heat generated during operation of the system.

Other objects, advantages, and applications of the present invention will become apparent to those skilled in the art of fluid-mechanical suspension systems when the accompanying description of an example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which.

DESCRIPTION OF THE PREFERRED EMBODIMENT

Figure 1:
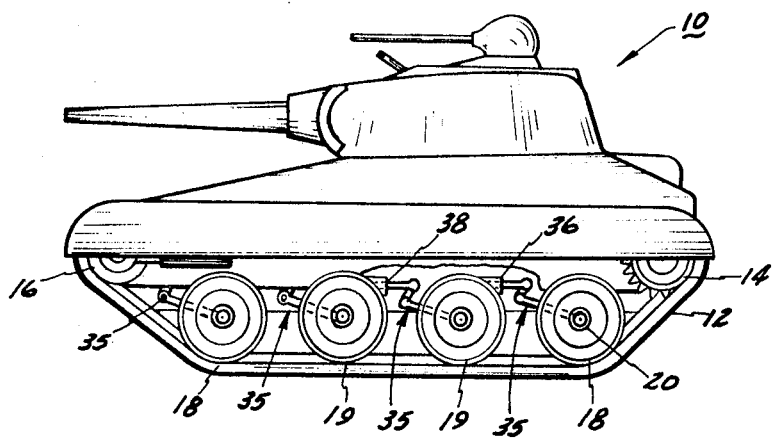
FIG. 1 is a side elevational view of a military tracked vehicle incorporating a fluid-mechanical suspension system constructed in accordance with the present invention.

Referring to the drawings, and particularly to FIG. 1, there is illustrated an armored military combat vehicle 10 of the track type having an endless track 12 at each side of the vehicle carried by a drive sprocket 14 at the rearward end of the vehicle and an idler 16 at the forward end of the vehicle. The vehicle 10 is supported by a series of individually mounted corner road wheels 18 and intermediate road wheels 19 which ride on the track 12 to support and guide the same. In this example of the invention, four road wheels are provided at each side of the vehicle, resulting in a total of two forward and two rear corner wheels 18 and four intermediate road wheels 19. However, it is to be understood that the number of road wheels may vary in accordance with the requirements of particular vehicle design.

Figure 5:
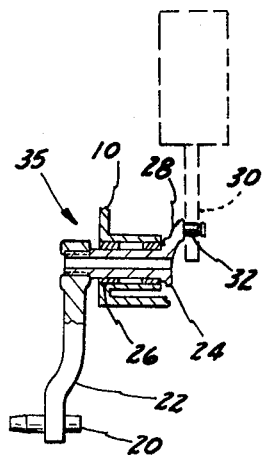
FIG. 5 is a fragmentary cross-sectional view of a portion of a non-linear variable ratio mechanical transmission used in the fluid-mechanical suspension system of FIGS. 1 and 2 and taken along line 5—5 of FIG. 1.
Figure 6:
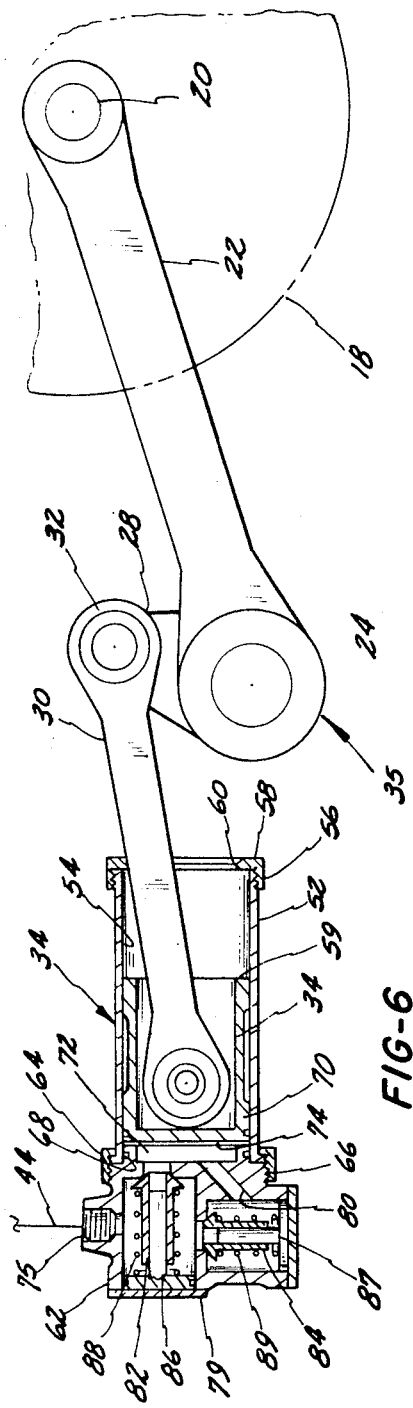
FIG. 6 is a longitudinal view of the mechanical transmission coupled to a fluid cylinder with the fluid cylinder portion thereof shown in section.
Figure 9:
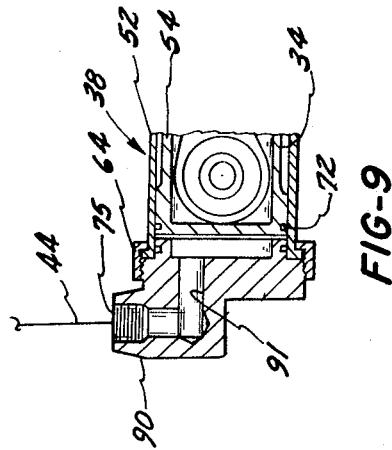
FIG. 9 is a fragmentary sectional view of a fluid cylinder showing a modification of the fluid cylinder illustrated in FIG. 6.

As can best be seen in FIGS. 5 and 6, each road wheel 18 or 19 is rotatably fastened to a spindle 20 in a conventional manner, the spindle 20, in turn, being fixedly attached to one end of a support arm 22. The support arm 22 is fixedly attached to a second spindle 24 which is journalled in a bearing 26 carried by the vehicle 10. The opposite end of the spindle 24 projects from the bearing 26 and has a crank arm 28 extending radially therefrom which, in turn, is pivotably connected to an end of a connecting rod 30 by any suitable means, such as by the pin and bushing assembly 32 illustrated in FIG. 6. The other end of the connecting rod 30 is pivotably connected to a piston 34 by any suitable means, such as a pin and bushing assembly 39, the piston 34 being slidably disposed in a cylinder 36 (FIG. 6) or 38 (FIG. 9). The wheel support arm 22, the spindle 24 with its bearing 26, the crank arm 28 and the connecting rod 30 form a non-linear variable ratio mechanical transmission or coupling means 35, the operation of which will be explained in greater detail hereinafter, between the road wheel 18 or 19 and the piston 34.

Figure 2:
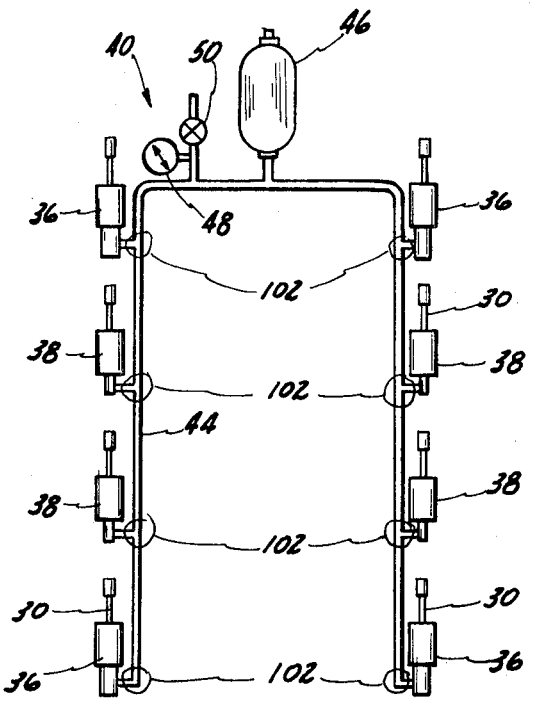
FIG. 2 is a schematic illustration of the fluid-mechanical suspension system of the vehicle of FIG. 1.

Referring to FIG. 2, there is schematically illustrated a fluid circuit 40 of the fluid-mechanical suspension system particularly adapted for use with a vehicle of the type illustrated at FIG. 1. The fluid circuit 40 comprises a plurality of fluid cylinders 36 and 38 individually mounted to the vehicle frame and interconnected by a large capacity fluid conduit 44 to one another and to a fluid accumulator 46. The circuit 40 includes a pressure gage 48 and a fill valve 50, and appropriate connectors for allowing the fluid-mechanical suspension system to be filled initially with an appropriate volume of fluid such as a hydraulic or transmission fluid and to be replenished as required. The fluid-mechanical suspension system is illustrated as comprising two forward and two rear corner road wheel supporting fluid cylinders 36 and associated mechanical transmissions which are adapted to support the forward and rear corner wheels 18 of the vehicle 10 (FIG. 1) and four intermediate wheel supporting cylinders 38 and associated mechanical transmissions which are adapted to support the intermediate road wheels 19.

Figure 7:
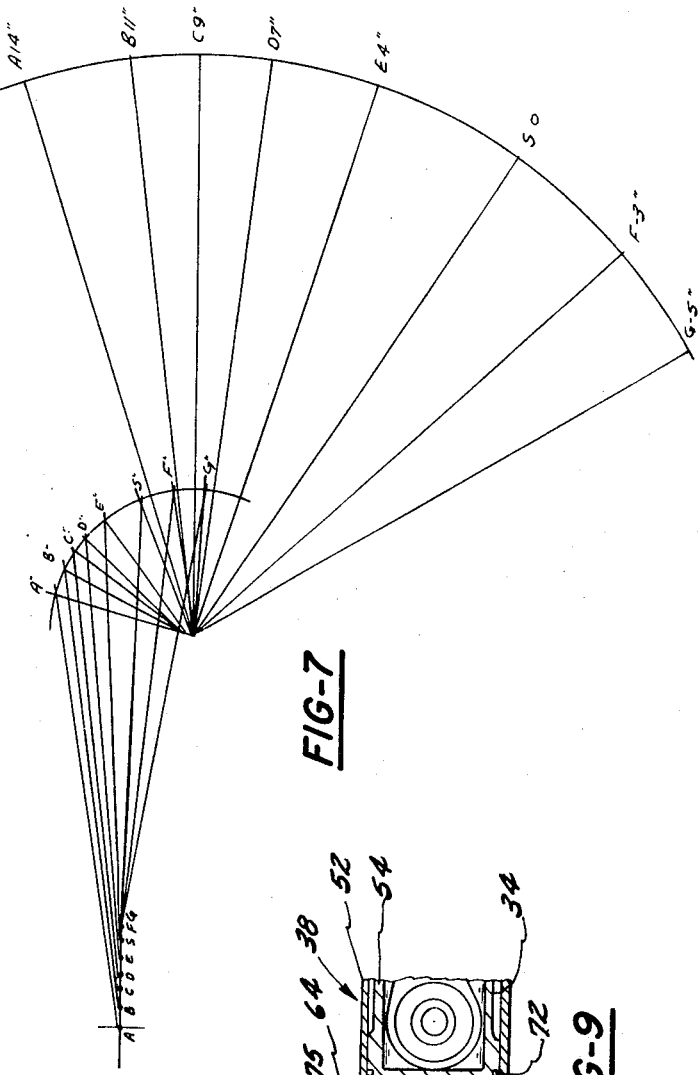
FIG. 7 is a graphic illustration of the relative positions of the several components of a suspension unit of the fluid-mechanical suspension system with respect to the vertical displacement of the wheel supported by such suspension unit.

Referring to FIGS. 6 and 7, there is shown respectively a sectional view of one of the corner road wheel supporting cylinders 36 with its associated mechanical transmission 35, and a graphic representation of the mechanical transmission 35 showing the relative position of the cylinder piston 34 as a function of the vertical displacement of a road wheel 18. Each of s the corner road wheel supporting cylinders 36 is illustrated as comprising a tubular housing 52, having a cylindrical bore 54 in which the reciprocable piston 34 is mounted for relative sliding movement in a conventional manner. A portion of the outer periphery of the tubular housing 52 has a threaded surface 56 on which a cup-shaped cap 58 is securely fastened. The cap 58 has a central opening 60 through which the connecting rod 30 extends. As viewed in FIG. 6, the cap 58 acts as a stop to limit the rightward movement of the piston 34 by engagement with the bottom annular surface 59 of the skirt of the piston 34.

A valve housing 62 is fastened to the left end of the tubular housing 52 by means of a threaded cap 64 which engages the outer threaded periphery 66 of the valve housing 62. Seals 68 and 70 respectively carried by the valve housing 62 and the piston 34 insure a fluid tight seal for a pressure chamber 72 formed between the valve housing 62 and the top face 74 of the piston 34. The valve housing 62 has a single port 75 to provide fluid communication between the fluid cylinder 36, via the valve housing 62, and the accumulator 46 (FIG. 2) through the fluid conduit 44.

The valve housing 62 has two partitions 76 and 78 respectively having apertures 77 and 79 which, for purpose of description, respectively form the outlet and inlet of the pressure chamber 72 in the cylinder 36. The inlet aperture 79 communicates with the pressure chamber 72 through a passageway 80 extending through the partition 76, while the outlet aperture 77 is in direct communication with the pressure chamber 72. The valve housing 62 includes a pair of area differential valves 82 and 84 which are slidably mounted on guide posts 86 and 87 to open and close communication between the cylinder pressure chamber 72 and the inlet and outlet apertures 79 and 77 respectively. Springs 88 and 89 respectively associated with the area differential valves 82 and 84 bias the valves to the closed position illustrated in FIG. 6.

The valves 82 and 84 require a predetermined pressure differential across them prior to opening. The inlet valve 84 is normally biased to a closed position preventing fluid communication between the fluid conduit 44 and the cylinder pressure chamber 72. The accumulator 46 (FIG. 2) maintains the pressure within the fluid circuit 40 at some selected pressure which acts against the face of the valve 84, tending to urge the valve 84 to open communication between the conduit 44 and the pressure chamber 72. At the same time, pressure acting against the pressure chamber side of the piston 84, in addition to the force exerted thereon by the spring 89, tends to maintain the area differential valve 84 in a closed position. As the piston 34 is moved rightwardly as viewed in FIG. 6, the pressure on the pressure chamber side of the inlet valve 84 will decrease and at some predetermined pressure differential, the valve 84 will open communication between the conduit 44 and the pressure chamber 72.

The outlet valve 82 operates in a manner similar to the operation of the valve 84. When the piston 34 is moving in a leftwardly direction as viewed in FIG. 6, the fluid pressure in the cylinder pressure chamber 72 will rise, generating force acting against the valve 82 tending to open communication between the cylinder pressure chamber 72 and the conduit 44. The combined forces exerted by the spring 88 and the system pressure against the valve 82 will resist opening of the valve 82 until a predetermined pressure differential exists, at which time the valve 82 will open and fluid will be exhausted from the cylinder pressure chamber 72. The valves 82 and 84 provide a means for dampening the movement of the piston 34 as the same is reciprocated back and forth within the cylinder housing 52. The movement of the piston 34 is a function of the vertical displacement of the wheels 18, all of which will be described in greater detail hereinafter.

The intermediate cylinders 38 are substantially identical to the corner cylinders 36 with the exception that they are provided with an end cover 90 in lieu of the valve housing 62 associated with the corner cylinders 38. The fluid pressure chambers 72 in the cylinders 38 are in direct communication with the conduit 44 through an internally bored passageway 91 and port 75, as illustrated in the fragmentary sectional view of FIG. 9. The intermediate cylinders 38 may be dampened in a manner similar to the corner cylinders 36 in applications when desired or required. In tracked vehicles, it is not generally desirable to provide dampening of the movement of the intermediate wheels, thus a direct communication between the pressure chambers 72 of each cylinder 38 and the accumulator 46 may be provided. However, it is preferable to dampen the movement of the corner wheels.

Figure 8:
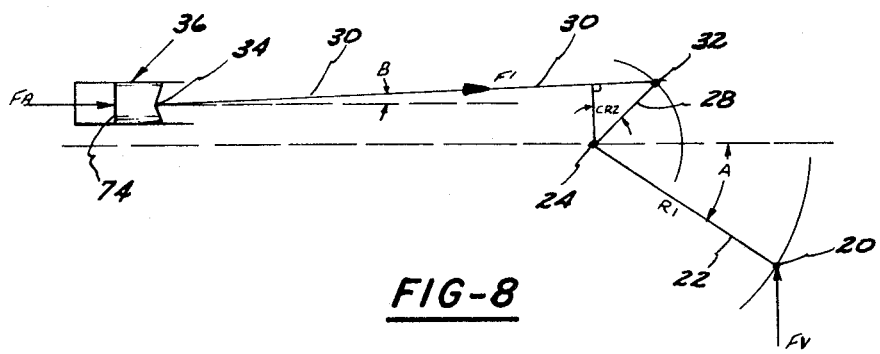
FIG. 8 is a force diagram of the non-linear variable ratio mechanical transmission shown in FIG. 6.

Referring to FIG. 5, and more particularly to FIGS. 6, 7 and 8, it can be seen that as the vehicle is driven over uneven terrain causing a corner road wheel 18 to be displaced vertically upwardly from a normal position, or static position, wherein the suspension system supports the static weight of the vehicle, the wheel support arm 22 pivots about the axis of the spindle 24. Since the support arm 22, the spindle 24 and the crank arm 28 are fixedly attached to each other, both the support arm 22 and the crank arm 28 rotate about the axis of the spindle 24 an equal angular distance. As the crank arm 28 rotates counter-clockwise as viewed in FIG. 6 under the force of the wheel 18 being displaced in an upwardly direction from the static position, the connecting rod 30 drives the piston 34 leftwardly, thus resulting in a decrease of the volume of the pressure chamber 72 within the associated cylinder 36. When the corner wheel 18 is on the contrary vertically lowered from the static position, the support arm 22 and the crank arm 28 cause the connecting rod 30 to drive the piston rightwardly as seen in FIG. 6, increasing the volume of the cylinder pressure chamber 72. The volume of the cylinder pressure chamber 72 within the cylinder is also similarly increased or decreased as to whether one of the intermediate road wheels 19 is vertically raised or lowered.

It is obvious that when the volume of any of the cylinder pressure chambers 72 is increased as a result of a downward vertical displacement of the corresponding road wheel, fluid is introduced into the cylinder pressure chamber 72 through the common conduit 44 (FIG. 2) from the accumulator 96, while when the volume of the pressure chamber 72 is decreased as a result of an upward motion of the corresponding road wheel, fluid is exhausted from the pressure chamber 72 into the common conduit 44 to the accumulator 46. The instantaneous fluid pressure in the system is thus dependent upon the vertical displacement of each individual wheel and the number of wheels thus displaced, upward vertical displacement of the wheels resulting in an increase of the system pressure, while downward vertical displacement of the wheels results in an overall decrease of the system pressure. The flow of fluid into and from the pressure chamber 72 of each cylinder 39 associated with the intermediate road wheel is effected substantially unimpeded, while the fluid flow from and into the pressure chamber 72 of each of the corner wheel carrying cylinders 36 is not permitted until a predetermined pressure differential is established across the valves 82 and 84 as heretofore described, such that the movement of the piston 34 within the cylinders 36 and the vertical movement of the corner wheels 18 operatively coupled thereto are dampened.

FIG. 6 shows the piston 34 in its leftmost position corresponding to the point A' in FIG. 7, with the wheel 18 displaced vertically from its static position S to an extreme position. The positions of the end of the crank arm 28 and of the end of the support arm 22 supporting the road wheel are graphically indicated in FIG. 7 by points A'' and A' respectively. Points A' through G' in FIG. 7 therefore illustrate the successive positions of the piston 34 as the road wheel 18 is vertically displaced to the corresponding positions graphically indicated by points A through G, while the points A'' through G'' illustrate the corresponding positions of the end of the crank arm 28.

The following table is exemplary of a hydromechanical suspension system according to the invention adapted to support a vehicle having a sprung weight of 16,800 lbs. by means of eight road wheels, each of which is adapted to support 2100 lbs. in a static position, reference being had to FIG. 7:

| Vertical position (inches) of the wheel from a static position S (FIG. 7) | Stroke (inches) of the piston 34 | Vertical force $F_v$ (Lbs.) imparted to the wheel |
|---|---|---|
| A = 14 | A' = 3.64 | 3925 |
| B = 11 | B' = 3.33 | 3462 |
| C = 9 | C' = 3.07 | 3170 |
| D = 7 | D' = 2.81 | 2935 |
| E = 4 | E' = 2.37 | 2595 |
| S = 0 | S' = 1.67 | 2100 |
| F = −3 | F' = 1.05 | 1633 |
| G = −5 | G' = 0.04 | 978 |

The system characteristics are calculated for a static system pressure of 1732 psi with a connecting rod 30 having a length of 12 inches, the crank arm 28 having a length of 4 inches and the support arm 22 having a length of 16 inches.

Figure 4:
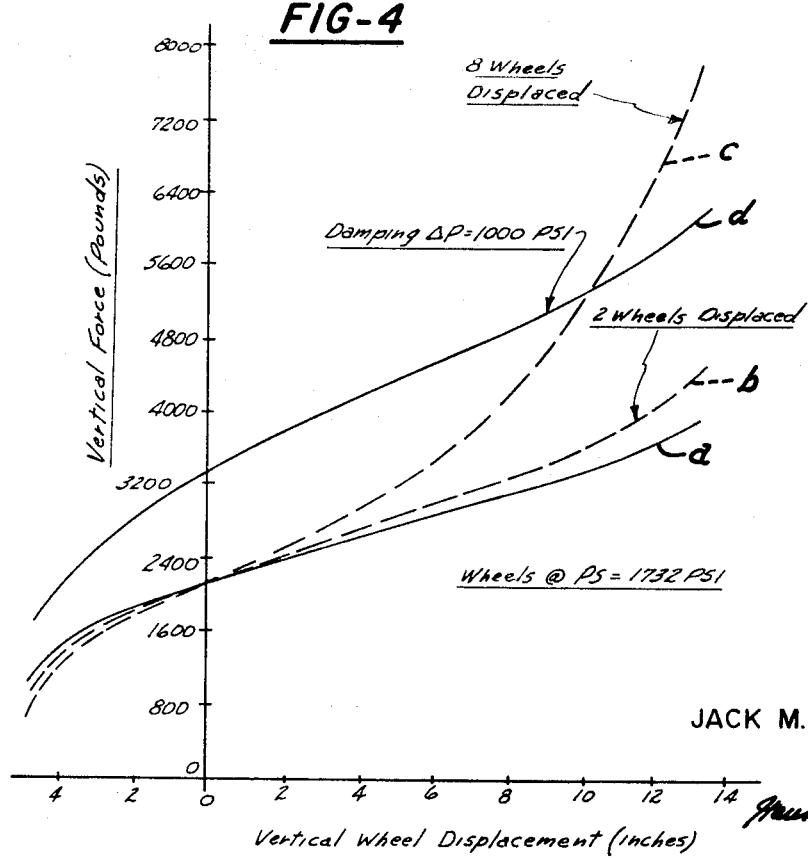
FIG. 4 is a graphic illustration of the performance characteristics of the fluid-mechanical suspension system shown in FIGS. 1 and 2.

An examination of the vertical force $F_v$ tabulated above and as shown in FIG. 4 clearly illustrates that the non-linear mechanical transmission 35 provides a substantially linear variation in the force $F_v$ as the vertical displacement of the wheel changes from static to full displacement.

With reference to FIG. 8 the vertical force $F_v$ imparted by the ground on a wheel may be calculated from the following equations:

$$F_a = P_s A_p \quad (1)$$

wherein $F_a$ = force acting on the piston 34,
$P_s$ = system pressure, and
$A_p$ = area of the piston face.

The reactive force $F_1$ along the center line of the connecting rod 30 is given by the equation:

$$F_1 = F_a \cos B \quad (2)$$

wherein $B$ = angle between the longitudinal center lines of the piston 34 and of the connecting rod 30.

The torque $T$ at the support arm spindle 24 is given by the equation:

$$T = F_1 R_2 \sin C \quad (3)$$

wherein $R_2$ = radius of the crank arm 28, and
$C$ = angle between the crank arm 28 and a line perpendicular to the connecting rod 30 which passes through the center of rotation of the support arm spindle 24.

The vertical force $F_v$ imparted to a wheel is:

$$F_v = (T/R_1 \cos A) \quad (4)$$

wherein $R_1$ = radius of the support arm 22, and
$A$ = angle between the support arm 22 and the horizontal.

Thus, by replacing in equation (4) the torque T by its value as expressed in equation (3):

$$F_v = (F_1 R_2 \sin C)/(R_1 \cos A) \quad (5)$$

and by replacing in equation (5) $F_1$ by its value as expressed in equation (2):

$$F_v = (F_a (\cos B) R_2 \sin C)/(R_1 \cos A) \quad (6)$$

By substituting $F_v$ for its value from equation (1), the expression becomes:

$$F_v = (P_s A_p (\cos B) R_2 \sin C)/(R_1 \cos A) \quad (7)$$

or $F_v = (P_s A_p R_2)/R_1 (\cos B \sin C)/\cos A \quad (8)$

Since $A_p$, $R_1$ and $R_2$ are constant, the change in the vertical force $F_v$ will be a function of the system pressure $P_s$ and the relative angular positions of the connecting rod 30, the crank arm 22 and the support arm 32. As the vertical displacement of the wheels increases, even if it is assumed that the system pressure $P_s$ remains substantially constant, $(\cos B \sin C)/(\cos A)$ increases in a non-linear manner. Thus, the fluid-mechanical suspension system of the invention by providing at each wheel a non-linear variable ratio mechanical transmission coupling between the wheel and the fluid cylinder 36 (or 38) results in combination with the common source of system pressure in a positive rate of change of the vertical force imparted to each wheel corresponding to a linear change in the vertical displacement of each wheel.

Figure 8A:
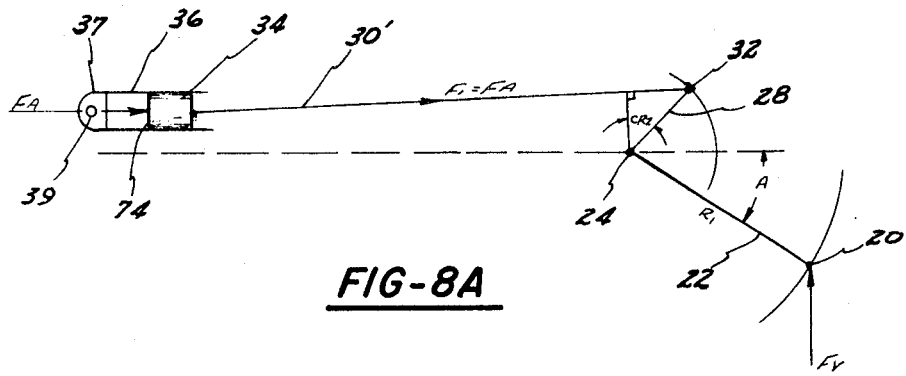
FIG. 8a is a schematic representation of a modification of the invention providing a simplification of the force diagram of FIG. 8.

An alternate structure to the one described and illustrated is schematically represented at FIG. 8a. In such alternate structure, the piston 34 in the cylinder 36 (or 38) is provided with a rigid connecting rod 30' having its end pivotally connected to the end of the crank arm 28. The cylinder 36 (or 38) is pivotally mounted relative to the vehicle hull, such as by means of a mounting flange 37 provided with a pivotal attachment means shown at 39, to permit the center line of the cylinder to be at all time aligned with the center line of the connecting rod 30'. With such a structure, equation (8) becomes:

$$F_v = (P_s A_p R_2/R_1) (\sin C/\cos A) \quad (9)$$

The non-linear variable ratio mechanical transmission 35 causes positive suspension of the vehicle under all conditions. In other words, if the center of gravity of the vehicle is shifted, for example, to one side of its center line, all the wheels on the side of the vehicle corresponding to the side to which the center of gravity has been shifted are caused to support a greater load, while all the wheels on the other side are caused to support a comparatively decreased load. Because the vertical $F_v$ imparted by a wheel on the ground is always positive, as a result of each term of equation (8) or equation (9) being always positive, the vehicle is constantly supported by the suspension system of the invention. By comparison, if the mechanical coupling between the wheel support arm and the fluid cylinder piston was a linear constant ratio mechanical transmission, tilting of the vehicle as a result of a shift of its center of gravity to one side of its center line would result in exhausting fluid from the fluid cylinders on the lower side and introducing fluid into the fluid cylinders on the higher side of the vehicle. Such a suspension system, with a linear constant ratio mechanical transmission, would be incapable of operating as a vehicle fluid suspension system, unless each individual suspension fluid cylinder is provided with its own individual accumulator, as each piston would be capable only of displacing fluid through the common line into the other cylinders to cause proportional displacement of the piston in such other cylinders, without any of the self-equilibration effect generally associated with a suspension system. In effect, the use of a linear constant ratio mechanical coupling between the road wheels of a vehicle and their associated suspension fluid cylinders, instead of the non-linear variable ratio mechanical coupling of the invention, would cause both equations (8) or (9) to become:

$$F_v = P_s A_p (R_2/R_1)$$

(10)

Consequently, the reactive force $F_v$ on the ground is substantially constant as the system pressure $P_s$ is substantially constant. The equilibrium self-seeking capability of such a system is therefore substantially non-existent.

Figure 12:
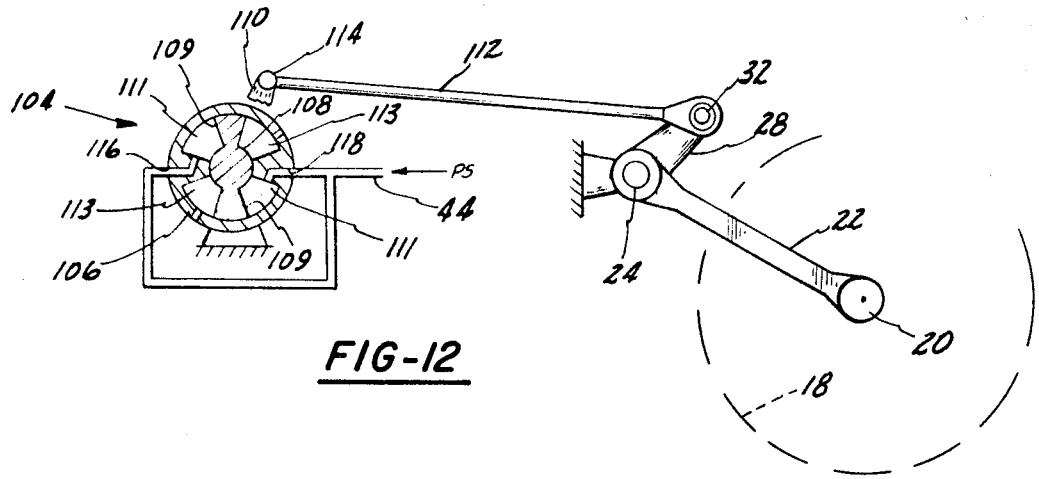
FIG. 12 is a schematic representation of another modification of the invention in which a rotary actuator is employed.

Another alternate structure to the one described and illustrated in FIGS. 1-8 is schematically represented in FIG. 12. In this alternate structure the fluid cylinders 36 and 38 are replaced by a rotary displacement mechanism 104 comprising a housing 106 rigidly fastened to the vehicle structure and an angularly displacable rotor 108 provided with vanes 109 dividing the interior of the housing into pressure chambers 111 and 113. An arm 110 having a length $R_3$ as measured along its longitudinal centerline from the axis of rotation of the rotor 108 is attached to the end of a rotor shaft (unnumbered) projecting from the housing 106. The arm 110 radially extends from the rotor shaft for connecting to the crank arm 28 of the spindle assembly by means of an appropriate connecting rod 112, the opposite ends of which are pivotally connected to the ends of the arm 110 and the crank arm 128 by pin and bushing assemblies 114 and 32, respectively, in a manner similar to that aforementioned with respect to the arrangments disclosed in FIGS. 1-9. The rotary mechanism 104, which is similar in construction to a conventional rotary actuator, has fluid inlet ports 116 and 118 connecting the pressure chambers 111 to line 44 which, in turn, is connected to a source of fluid pressure with the remaining of the system being as hereinbefore described. The pressurized fluid introduced through inlet ports 116 and 118 into the pressure chambers 111 on one side of the vanes 109 urge the rotor 108 in a clockwise direction, as viewed in FIG. 12, to oppose the upward vertical force applied by the wheel 18 mounted at the end of support arm 22. The chambers 113 within the housing 108 are normally vented to atmosphere. The crank arm 28, spindle 24, the wheel support 22 and the wheel 18 carried thereby are identical to the structure described hereinbefore and thus a further description thereof is not necessary.

Figure 13:
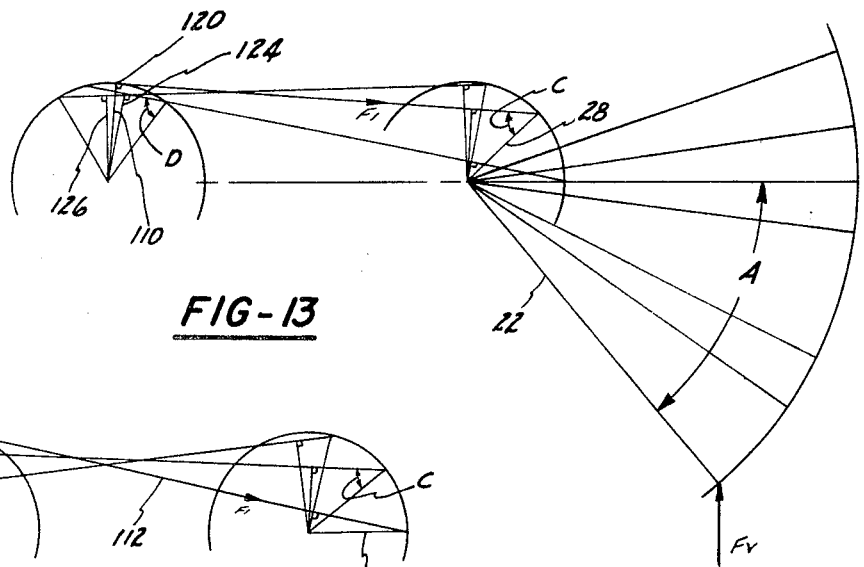
FIGS. 13, 14 and 15 are force diagrams illustrating the manner in which the operating characteristics of the modification shown in FIG. 12 may be varied.

With reference to FIG. 13, the vertical force $F_v$ imparted by the ground onto the wheel may be calculated from the following equation:

$$T_a = (P_s D_a)/2\pi$$

(11)

wherein $T_a$ = torque output of the rotary mechanism 104
$P_s$ = system pressure
$D_a$ = displacement of the rotary mechanism 104.

The reactive force $F_1$ along the center line of the connecting rod 112 is given by the equation:

$$F_1 = T_a/(R_3 \sin D)$$

(12)

wherein $D$ = acute angle between the center line of the connecting rod 112 and the center line of the arm 110.

The torque $T$ at the support arm spindle 24 is given by the equation:

$$T = F_1 R_2 \sin C$$

(13)

wherein $R_2$ = the radius of the crank arm 28 and
$C$ = the angle between the crank arm and a line perpendicular to the connecting rod 112 which passes through the center of rotation of the support arm spindle 24.

The vertical force $F_v$ imparted to the wheel is:

$$F_v = T/(R_1 \cos A)$$

(14)

wherein $R_1$ = the radius of the support arm 22 and
$A$ = angle between the support arm 22 and the horizontal.

By replacing in equation (14) the torque $T$ by its value as expressed in equation (13), $$F_v = (F_1 R_2 \sin C)/(R_1 \cos A)$$

(15)

and by replacing in equation (15) $F_1$ by its value as expressed in equation (12), and by substituting $F_v$ for its value from equation (11), the expression becomes:

$$F_v = (T_a \cdot R_2 \sin C)/(R_3 \sin D \cdot R_1 \cdot \cos A)$$

(16) or $$F_v = (P_s D_a/2\pi)(R_2/R_1 R_3)(\sin C/\sin D \cos A)$$

(17)

Since $D_a$, $R_1$, $R_2$ and $R_3$ are constant, the change in the vertical force $F_v$ is a function of the system pressure $P_s$ and the relative angular positions of the connecting rod 112, the crank arm 28, the support arm 22 and the arm 110. Thus, in suspension systems employing the rotary mechanism 104, the characteriistic of the force $F_v$ versus displacement of the wheel 18 may be additionally varied by changing the initial angular position of the arm 110.

Figure 14:
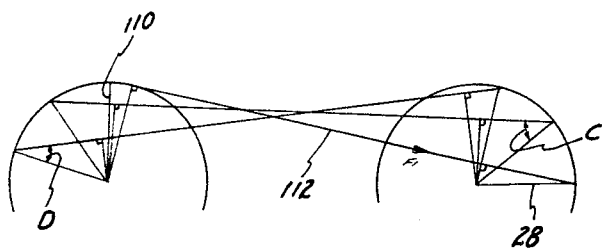
Figure 15:
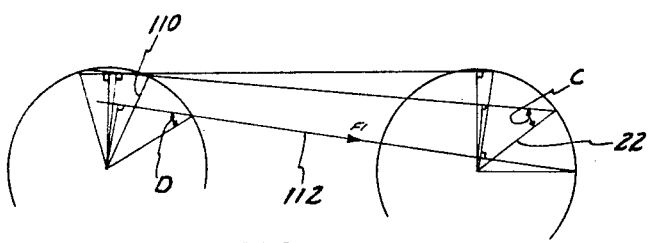

FIGS. 13, 14 and 15 illustrate three variations in the initial angular position of the arm 110 to provide for selected variations in the force $F_1$ and thus the vertical spring rate of the wheels 18.

In FIG. 13 the arm 110 of the rotor 108 is illustrated as being located at 120 when the wheel 18 is at its lowest vertical position; at 122 when the wheel 18 is in an intermediate position; and at 124 when the wheel 18 is displaced upwardly to a maximum vertical position. Since $F_1$ is relatively constant along this range of angular movement of the arm 110, the vehicle spring rate is similar to that of the linear mechanism described heretofore in the description of the embodiments disclosed in FIGS. 1-8 and 8a.

In FIG. 14 the positions of the arm 110 between maximum and minimum displacement of the wheel 18 are shown as varying to the left of the vertical. In this configuration the force $F_1$ increases as the wheel 18 moves upwardly. That is, as the arm 110 is rotated counterclockwise the spring rate of the wheel increases as the wheel moves upwardly.

In FIG. 15 the initial position of the arm 110 is to the right of the vertical, that is, angularly displaced in a clockwise direction as viewed in FIG. 15. In this embodiment the force $F_1$ decreases during the initial upward movement of the wheel 18 and then remains relatively constant as in the configuration shown in FIG. 13. Thus a lower spring rate is provided at and around the static height of the vehicle with an increase therein to a relatively constant spring rate as the wheels 18 move upwardly.

Figure 3:
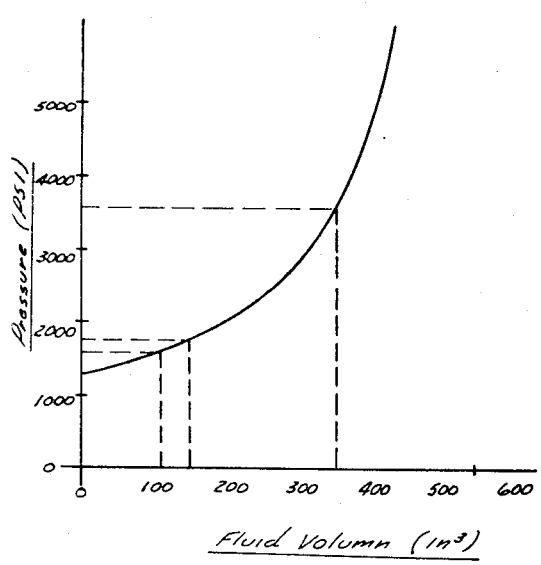
FIG. 3 is a graphic illustration of the performance characteristics of an accumulator used in the fluid-mechanical suspension system of FIGS. 1 and 2.

FIG. 3 illustrates the system pressure characteristics of a typical accumulator 46, for example a Greer A-104-200 accumulator having a capacity of 555 in.³, as a function of the volume of hydraulic fluid present in the accumulator. In the present example, the minimum system pressure is illustrated as being 1560 psi with all road wheels at the position G of FIG. 7, the pressure in the system when in a static condition is 1732 psi with all road wheels at the position S, and the maximum pressure of the system is 3540 psi with all road wheels at the position A.

FIG. 4 graphically illustrates the vertical force exerted on the road wheels as a function of the vertical displacement of the wheels. Curve $a$ illustrates the performance characteristics of one wheel at 1732 psi system static pressure. Curve $b$ illustrates the performance characteristics of two wheels at an initial system static pressure of 1732 psi. Curve $c$ illustrates the performance characteristics of the system when all eight wheels are vertically displaced. Curve $d$ illustrates the dampening force of the corner wheels when a differential pressure of 1000 psi is utilized for opening the differential area valve 82 (FIG. 6). FIG. 4 clearly shows that the fluid-mechanical suspension system of the present invention having a non-linear variable ratio mechanical transmission coupling each road wheel support arm to a fluid cylinder, in combination with a common pressure source, has a positive rate of change of the force exerted by the road wheels on the ground, resulting from a positive wheel displacement. It can also be seen that the spring rate of the suspension system and the energy storage capacity of the system increase with an increase in both the number of wheels displaced and the amount of vertical displacement of each wheel. This is due to the interconnection of the fluid cylinders of the system by way of a large capacity conduit 44 (FIG. 2) such that a high flow rate is established between the cylinders and the accumulator with a minimum of line loss. By interconnecting the several fluid cylinders with one another and with the accumulator, and by providing the non-linear variable ratio mechanical transmission of the invention as a coupling means between the wheel suspension arms and their associated fluid cylinders, the need for auxiliary mechanical or pneumatic springs in the suspension is completely eliminated, thus reducing the total weight of the suspension system to a minimum. For example, in the described embodiment of the invention, the total weight of the fluid-mechanical suspension system required to provide a suspension for a 16,800 lbs. vehicle is less than 300 lbs., not including the total weight of elements such as the suspension arms, road wheels and the like which are common to any suspension system. At the same time, the use of a minimum number of simple, lightweight parts insures a low cost system. By providing the non-linear variable ratio mechanical transmission of the invention using an appropriate geometrical relationship between the connecting rod, the crank arm and the wheel support arm, up to 105° of wheel support arm rotation, as shown at FIGS. 6 and 7, can be accommodated by the suspension system.

Since it is not necessary to store energy at each of the individual wheels to support the static weight of the vehicle, a low spring rate and long stroke for each wheel is attainable, as clearly shown by the force-displacement curves $a$, $b$ and $c$ of FIG. 4.

The flow of fluid between the fluid cylinders and the accumulator provides an efficient means for dampening the vehicle, as well as a means for distributing and dissipating the heat generated at each of the fluid cylinders during the operation of the suspension system. This ability of the system to dissipate and store energy as a function of the long stroke of the fluid cylinders combined with the dampening and accumulator capacity is sufficient to decelerate the downward velocity of a vehicle which has been thrown into the air, such as by hitting a large obstacle in the road at high speed, without the road arms striking vertical displacement stops which are normally provided on such vehicles.

Since a minimum number of simple and rugged parts are used in the suspension system, only one dynamic seal per actuation is required, the reliability of the system is substantially increased over the prior art designs. Since the substantially same structure is used and the structures for the corner wheel and intermediate wheel cylinders, of all the wheel support arms, all the crank arms, and all the journals and bearings are identical, the cost of manufacturing and maintaining the system is at a minimum due to the interchangeability of these components.

Figure 10:
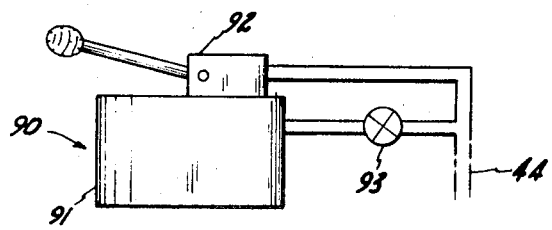
FIGS. 10 and 11 are schematic illustrations of modifications of the fluid suspension system of FIGS. 1 and 2.
Figure 11:
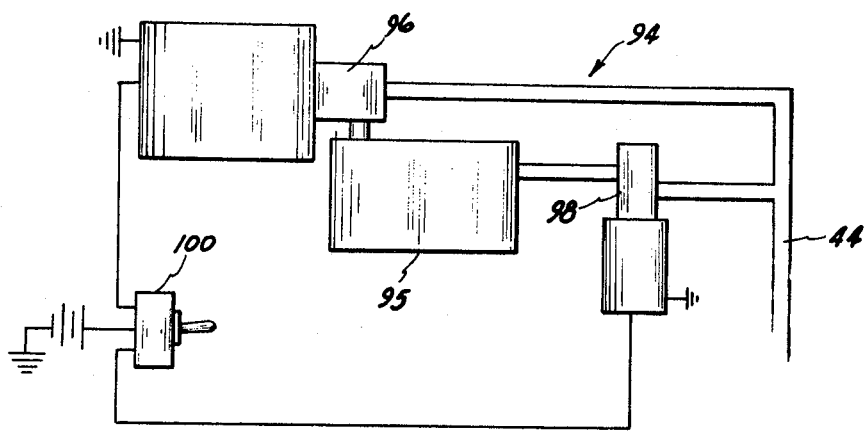

Referring now to FIGS. 10 and 11, there is schematically illustrated therein an additional feature of the invention for controlling the static height of the vehicle. By varying the static pressure of the system, the position of the piston or vanes may be varied in each cylinder and thus the vertical height of the wheels may be varied over their full range of vertical displacement. Thus, by having a low system static pressure, the vehicle may be lowered with respect to the ground on which it is carried. By increasing the system static pressure, the vehicle may be raised to any desired position or an optimum height may be maintained with changes in vehicle gross weight.

FIG. 10 illustrates a manual control mechanism 90 for varying the system pressure which comprises a reservoir of fluid 91, a hand pmp 92 having its inlet connected to the reservoir and its outlet connected to the conduit 44, and a return valve 93 connected between the conduit 44 and the reservoir 91. The manual control mechanism allows the operator of the vehcle to manually pressurize the system by means of the pump 92 to raise the vehicle to any desired vertical height, and by opening the return valve 93 to lower the vehicle.

FIG. 11 illustrates a power control mechanism 94 for varying the system pressure which comprises a reservoir of fluid 95, a motor driven pump 96 for transferring fluid from the reservoir to the conduit 44, a solenoid operated valve 98 disposed between the conduit 44 and the reservoir 95 and a control switch 100 for selectively actuating the solenoid operated valve 98 or the motor driven pump 96, whereby the operator may vary the height of the vehicle to a lower or higher position rapidly and effortlessly by utilizing the vehicle electrical power supply. The system pressure is raised and the vehicle raised to a higher static position when the pump 96 is actuated, while the system pressure is lowered and the vehicle lowered to a lower static position when the return valve 98 is open. The control switch 100, illustrated in FIG. 11, may be replaced by a variable setting pressure switch which enables the system to automatically maintain a pre-set pressure causing a resultant vehicle height despite changes in the fluid volume due to ambient and system temperature variation and losses of fluid due to seal leakage.

In addition, if so desired, a manual or solenoid operated valve (indicated schematically in FIG. 2 by the numeral 102) may be attached to each individual cylinder 36 and/or 38 for selectively closing off fluid communication between the pressure chamber 72 and the conduit 44, thereby trapping fluid within the pressure chamber 72 (FIG. 6) to lock out the suspension system pressure from that particular cylinder and maintain the wheel carried thereby at a specific position.

It can thus be seen that the present invention provides a fluid-mechanical suspension system which supports a vehicle at a desired static height and which, in conjunction with the mechanisms disclosed, has a non-linear ratio spring rate having a positive rate of change of force as the wheels of the vehicle are vertically displaced. The suspension system disclosed is rugged, lightweight, of low cost, and has high performance characteristics, all of which are not available in the prior art suspension systems.

Although only a few embodiments of the invention have been disclosed, it will be apparent to those skilled in the art of such fluid-mechanical suspension systems that many changes may be had without departing from the spirit of the invention or the scope of the appended claims.

What is claimed is as follows:

1. A fluid-mechanical suspension system for mounting a plurality of wheels to a vehicle, said system comprising means forming a plurality of expansible fluid pressure chambers respectively associated with said plurality of wheels, each of said pressure chambers having a movable wall member, a plurality of non-linear variable ratio mechanical transmissions, each operatively connecting each of said movable wall members to the wheel associated therewith, a source of fluid pressure, and means connecting to said source of fluid pressure each of said pressure chambers cooperating with its associated mechanical transmission to provide a positive rate of change in the vertical force exerted on its associated wheel as a function in the change in the vertical displacement of said associated wheel, wherein said mechanical transmission is operatively connected to said movable wall member of its associated fluid chamber in such a manner that vertical movement of said wheel in one direction causes expansion of said associated chamber, while vertical movement of said wheel in an opposite direction causes contraction of said associated chamber creating a pressure therein that exerts a force on said movable wall resisting said contraction, an accumulator means and fluid conducting means interconnecting said pressure chambers and said accumulator means, whereby the pressure in one of said pressure chambers is a function of the pressure in the others of said pressure chambers.

2. The fluid-mechanical suspension system of claim 1 wherein each of said means forming an expansible pressure chamber comprises a fluid cylinder and a piston reciprocally mounted within said fluid cylinder and defining therewith said expansible pressure chamber, said piston being operatively coupled to said associated wheel by said non-linear variable ratio mechanical transmission.

3. The fluid mechanical suspension system of claim 1 wherein each of said means forming an expansible pressure chamber comprises a rotary actuator having a stator with a rotor rotatably mounted therein and defining said expansible pressure chamber, said rotor being operatively coupled to said associated wheel by said non-linear variable ratio mechanical transmission.

4. The fluid-mechanical suspension system of claim 1 wherein said non-linear variable ratio mechanical transmission comprises bearing means carried by said vehicle, a spindle rotatable in said bearing means, a crank arm radially extending from said spindle and rotatable therewith, a wheel support arm radially extending from said spindle and rotatable therewith, said support arm rotatably supporting said associated wheel, and rod means for connecting said movable wall member to the radially extending end of said crank arm.

5. The fluid-mechanical suspension system of claim 4 wherein each of said means forming an expansible pressure chamber comprises a fluid cylinder and a piston reciprocably mounted within said fluid cylinder and defining therewith said expansible pressure chamber on one side of said piston, the other side of said piston being operatively coupled to said rod means.

6. The fluid-mechanical suspension system of claim 5 wherein said rod means is a connecting rod rigidly coupled to said piston and wherein the vertical force $F_v$ exerted on each wheel is determined by the following formula:

$$F_v = (P_s \, A_p \, R_2/R_1) \, (\sin C/\cos A)$$

wherein $P_s$ is the pressure in the associated fluid cylinder, $A_p$ is the area of the piston exposed to fluid in said associated fluid chamber, $R_2$ is the length of said crank arm, $R_1$ is the length of said support arm, $C$ is the angle between the crank arm and a line perpendicular to the connecting rod passing through the center of rotation of the spindle, and $A$ is the angle between the support arm and the horizontal.

7. The fluid-mechanical suspension system of claim 6 wherein said mechanical transmission is operatively connected to said movable wall member of its associated fluid cylinder in such a manner that vertical movement of said wheel in one direction causes expansion of said associated chamber, while vertical movement of said wheel in an opposite direction causes contraction of said associated chamber creating a pressure therein that exerts a force on said movable wall resisting said contraction, an accumulator means and fluid conducting means interconnecting said pressure chambers and said accumulator means, whereby the pressure in one of said pressure chambers is a function of the pressure in the other of said pressure chamber, and further comprising means for selectively varying the pressure of said fluid.

8. The fluid-mechanical suspension system of claim 5 wherein said rod means is a connecting rod pivotably coupled to said piston and wherein the vertical force $F_v$ exerted on each wheel is determined by the following formula:

$$F_v = (P_s \, A_p \, R_2/R_1) \, (\cos B \sin C/\cos A)$$

wherein $P_s$ is the pressure in the associated fluid cylinder, $A_p$ is the area of the piston exposed to fluid in said associated fluid chamber, $R_2$ is the length of said crank arm, $R_1$ is the length of said support arm, $B$ is the angle between the longitudinal center lines of the piston and of the connecting rod, $C$ is the angle between the crank arm and a line perpendicular to the connecting rod passing through the center of rotation of the spindle and $A$ is the angle between the support arm and the horizontal.

9. The fluid-mechanical suspension system of claim 8 wherein said mechanical transmission is operatively connected to said movable wall member of its associated fluid cylinder in such a manner that vertical movement of said wheel in one direction causes expansion of said associated chamber, while vertical movement of said wheel in an opposite direction causes contraction of said associated chamber creating a pressure therein that exerts a force on said movable wall resisting said contraction, an accumulator means and fluid conducting means interconnecting said pressure chambers and said accumulator means, whereby the pressure in one of said pressure chambers is a function of the pressure in the other of said pressure chambers; and further comprising means for selectively varying the pressure of said fluid.

10. The fluid mechanical-suspension system of claim 4 wherein each of said means forming an expansible pressure chamber comprise a rotary displacement mechanism having a housihg with an angularly displacable pressure responsive piston mounted therein and forming said expansible pressure chamber, said piston being operatively coupled to said means.

11. The fluid-mechanical suspension system of claim 10 wherein said rod means comprises a piston arm carried by said piston and angularly displacable therewith and a connecting rod pivotab'y coupling said piston arm the vertical force $F_v$ exerted on each wheel is determined by the following formula:

$$F_v = (P_s \, D_a/2\pi) \, (R_2/R_1 \, R_3) \, (\sin C/\sin D \cos A)$$

wherein $P_s$ is pressure in the rotary displacement mechanism, $D_a$ is the displacement per revolution of the rotary dispacement mechanism, $R_1$ is the length of the suppoRt art, $R_2$ is the length of the crank arm, $R_3$ is the length of the piston arm, $A$ is the angle between the support arm and the horizontal, $C$ is the angle between the crank arm and a line perpendicular to the connecting rod which line passes through the center of rotation of the spindle, and $D$ is an acute angle between the center line of the connecting rod and the center line of the piston arm.

12. The fluid-mechanical suspension system of claim 11 wherein said mechanical transmission is operatively connected to said movable wall member of its associated rotary displacement mechanism in such a manner that vertical movement of said wheel in one direction causes expansion of said associated chamber, while vertical movement of said wheel in an opposite direction causes contraction of said associated chamber creating a pressure therein that exerts a force on said movable wall resisting said contraction, an accumulator means and fluid conducting means interconnecting said pressure chambers and siad accumulator means, whereby the pressure in one of said pressure chambers in a function of the pressure in the other of said pressure chambers; and further comprising means for selectively varying the pressure of said fluid.

13. The fluid-mechanical suspension system of claim 1 wherein a selected number of said fluid chambers comprise an inlet and an outlet placing said pressure chambers in communication with said means connecting said pressure chamber to said source of fluid pressure, first pressure responsive valve means cooperating with said inlet for preventing fluid communcation between said chamber and said fluid connecting means until the pressure in said fluid connecting means exceeds the pressure in said pressure chamber by a predetermined amount, and second pressure responsive valve means cooperating with said outlet for preventing fluid communication between said pressure chamber and said fluid connecting means until the pressure of the fluid in said pressure chamber exceeds the pressure in said fluid connecting means by a predetermined amount.

14. The fluid-mechanical suspension system of claim 13 wherein each of said pressure responsive valve means further comprises spring means biasing said valve means to a position cutting off communication between said pressure chamber and said fluid connecting means.

15. The fluid-mechanical suspension system of claim 13 wherein each of said means forming an expansible pressure chamber comprises a fluid cylinder and a piston reciprocably mounted with said fluid cylinder and defining therewith said expansible pressure chamber, and said piston being operatively coupled to said associated wheel by said mechanical transmission.

16. The fluid-mechanical system as defined in claim 13 wherein each of said means forming an expansible pressure chamber comprises a rotary displacement mechanism having a housing with an angularly displacable pressure responsive piston mounted therein and forming said expansible pressure chamber, said piston being operatively coupled to said associated wheel by said mechanical transmission.

17. The fluid-mechanical system of claim 1 further comprising means for selectively preventing communication between said source of fluid pressure and each of said pressure chambers.

18. The fluid-mechanical suspension system of claim 1 further comprising means for selectively varying the pressure of said fluid.

19. The fluid-mechanical suspension system of claim 18 wherein the vertical force exerted on said associated wheel is increased when the pressure of said fluid is increased and the vertical force exerted on said wheel is decreased when said pressure is decreased whereby the height of said vehicle may be selectively varied.

* * * * *

BJA-102-A         UNITED STATES PATENT OFFICE
              CERTIFICATE OF CORRECTION

Patent No. 3,752,499     Dated August 14, 1973

Inventor(s) JACK M. BRANDSTADTER

It is certified that error appears in the above-identified patent and that said Letters Patent are hereby corrected as shown below:

IN THE SPECIFICATION

Column 4, line 16, after "of" delete "s"

Column 7, correct equation (4) to:

-- $F_v = T/(R_1 \cos A)$ -- correct equation (8) to:

-- or $F_v = (P_s A_p R_2/R_1)(\cos B \sin C/\cos A)$ --

Column 9, correct equation (12) to:

-- $F_1 = T_a/(R_3 \sin D)$ --

Column 10, correct equation (14) to:

-- $F_v = T/(R_1 \cos A)$ -- line 41, correct the spelling of "characteristic"

Column 12, line 51, correct the spelling of "vehicle"

Page Two
Patent No. 3,752,499

IN THE CLAIMS

Column 15, line 31, after "said" insert -- rod -- line 35, correct the spelling of "pivotably"

line 36, after "arm" insert -- to said radially extending end of said crank arm, wherein -- line 43, correct the spelling of "support arm"

Column 16, line 3, correct the spelling of "said"

Signed and sealed this 25th day of December 1973.

(SEAL)
Attest:

EDWARD M. FLETCHER, JR.
Attesting Officer

RENE D. TEGTMEYER
Acting Commissioner of Patents